United States Patent
Nakajima et al.

(10) Patent No.: US 9,855,905 B2
(45) Date of Patent: Jan. 2, 2018

(54) VEHICLE POWER SUPPLY DEVICE

(71) Applicant: Sanyo Electric Co., Ltd., Osaka (JP)

(72) Inventors: Kaoru Nakajima, Hyogo (JP);
Akinobu Tsunesada, Hyogo (JP);
Hideki Sakata, Hyogo (JP); Nobuyuki Ohsumi, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 267 days.

(21) Appl. No.: 14/429,360

(22) PCT Filed: Oct. 17, 2013

(86) PCT No.: PCT/JP2013/006167
§ 371 (c)(1),
(2) Date: Mar. 18, 2015

(87) PCT Pub. No.: WO2014/068883
PCT Pub. Date: May 8, 2014

(65) Prior Publication Data
US 2015/0239411 A1 Aug. 27, 2015

(30) Foreign Application Priority Data

Oct. 29, 2012 (JP) ................................. 2012-238293

(51) Int. Cl.
*B60R 16/04* (2006.01)
*B60R 16/033* (2006.01)
(Continued)

(52) U.S. Cl.
CPC ............ *B60R 16/04* (2013.01); *B60R 16/033* (2013.01); *F02N 11/087* (2013.01);
(Continued)

(58) Field of Classification Search
CPC ........................... H02J 2001/006; B60R 16/04
(Continued)

(56) References Cited

U.S. PATENT DOCUMENTS

| 8,072,725 B2 * | 12/2011 | Kosaki | H02H 5/00 361/23 |
| 2014/0203637 A1 * | 7/2014 | Sugiyama | B60L 11/18 307/10.1 |
| 2015/0224878 A1 * | 8/2015 | Hashimoto | B60L 1/02 307/10.1 |

FOREIGN PATENT DOCUMENTS

| JP | 2011-176958 | | 9/2011 |
| JP | 2011176958 A | * | 9/2011 |
| JP | 2012-130108 | | 7/2012 |

OTHER PUBLICATIONS

International Search Report of PCT application No. PCT/JP2013/006167 dated Nov. 26, 2013.

* cited by examiner

*Primary Examiner* — Rexford Barnie
*Assistant Examiner* — Joseph Inge
(74) *Attorney, Agent, or Firm* — Wenderoth, Lind & Ponack, L.L.P.

(57) ABSTRACT

A first power storage portion stores power generated by a generator in a vehicle, and supplies power to a motor for starting an engine and an electric device in the vehicle. A second power storage portion is connected to the first power storage portion in parallel, and stores power generated by the generator, and supplies power to the electric device in the vehicle. The first power storage portion and the second power storage portion are connected each other in parallel. A first switch is inserted in a path between the first power storage portion and the second power storage portion. A diode is connected in parallel with the first switch such that (Continued)

a cathode side thereof is connected to the second power storage portion side. A second switch is provided between the path and the second power storage portion.

4 Claims, 6 Drawing Sheets

(51) Int. Cl.
  *F02N 11/10* (2006.01)
  *H02J 7/14* (2006.01)
  *F02N 11/08* (2006.01)
(52) U.S. Cl.
  CPC ........ *F02N 11/0866* (2013.01); *F02N 11/108* (2013.01); *H02J 7/1423* (2013.01); *F02N 11/0814* (2013.01)
(58) Field of Classification Search
  USPC ....................................................... 307/10.6
  See application file for complete search history.

|  | remaining capacity | first switch S1 | second switch S2 |
|---|---|---|---|
| time of non-regeneration (time of discharging) ||||
| first storage battery(lead) second storage battery(Ni-Hydride) | minimum or more minimum or more | OFF | ON |
| first storage battery(lead) second storage battery(Ni-Hydride) | minimum or more less than minimum | ON | OFF |
| first storage battery(lead) second storage battery(Ni-Hydride) | less than minimum minimum or more | OFF | ON |
| time of regeneration (time of charging) ||||
| first storage battery(lead) second storage battery(Ni-Hydride) | minimum or more minimum or more | ON | ON |
| first storage battery(lead) second storage battery(Ni-Hydride) | minimum or more less than minimum | ON | ON |
| first storage battery(lead) second storage battery(Ni-Hydride) | less than minimum minimum or more | ON | OFF |

FIG. 6

VEHICLE POWER SUPPLY DEVICE

TECHNICAL FIELD

The present invention is related to a vehicle power supply device installed in the vehicle.

BACKGROUND ART

At present, a lead battery is installed in many vehicles. This lead batter supplies power to a starter motor, or many kinds of electric devices. The lead battery is inexpensive, but has the characteristics of a short cycle life, compared with a nickel hydride storage battery or a lithium ion storage battery. In the vehicles having the idle stop function (idle reduction function), as the number of charging and discharging is large, especially the life of the lead storage battery becomes short.

Then, a configuration in which the lead storage battery, and the nickel hydride storage battery or the lithium ion storage battery are connected in parallel is proposed. In this parallel circuit, it is proposed that a switch between the lead storage battery and the nickel hydride storage battery or the lithium ion storage battery is provided (for example, refer to patent literature 1). Mainly, this switch is turned off when power is supplied from the lead storage battery to the starter motor, and is used in order to stabilize a voltage supplied from the nickel hydride storage battery or the lithium ion storage battery to the electric devices. Further, it is proposed that a switch which controls charging or discharging of the nickel hydride storage battery or the lithium ion storage battery, is also provided (for example, refer to patent literature 1).

CITATION LIST

Patent Literature

Patent Literature 1: Japanese Laid-Open Patent Publication No. 2011-176958

SUMMARY OF THE INVENTION

As the trouble of the above two switches largely influences the storage battery or the electric devices, it is necessary to confirm whether or not these switches are normal.

The present disclosure is developed for the purpose of such needs. One non-limiting and explanatory embodiment provides a technology which efficiently confirms whether or not a switch for controlling power storage portions installed in a vehicle and connected in parallel, is normal.

A vehicle power source device of the present disclosure comprises a first power storage portion which stores power generated by a generator in a vehicle, and supplies power to a motor for starting an engine and an electric device in the vehicle, a second power storage portion which is connected to the first power storage portion in parallel, and stores power generated by the generator, and supplies power to the electric device in the vehicle, a first switch which is inserted in a path between the first power storage portion and the second power storage portion, a diode which is connected in parallel with the first switch such that a cathode side thereof is connected to the second power storage portion side, a second switch which is provided between the path and the second power storage portion, and a controlling portion which controls the first switch and the second switch. The controlling portion carries out the OFF state of the first switch and the second switch at the time of starting, and after that the controlling portion turns on the second switch, and the first switch in this order.

A vehicle power source device of the present disclosure comprises a first power storage portion which stores power generated by a generator in a vehicle, and supplies power to a motor for starting an engine and an electric device in the vehicle, a second power storage portion which is connected to the first power storage portion in parallel, and stores power generated by the generator, and supplies power to the electric device in the vehicle, a first switch which is inserted in a path between the first power storage portion and the second power storage portion, a diode which is connected in parallel with the first switch such that a cathode side thereof is connected to the second power storage portion side, a second switch which is provided between the path and the second power storage portion, and a controlling portion which controls the first switch and the second switch based on at least a remaining capacity of the second power storage portion. The controlling portion carries out the ON state of the second switch and the OFF state of the first switch, in a state that power is not supplied from the generator to the vehicle power source device, when the remaining capacity of the second power storage portion is more than a predetermined minimum capacity.

A vehicle power source device of the present disclosure comprises a first power storage portion which stores power generated by a generator in a vehicle, and supplies power to a motor for starting an engine and an electric device in the vehicle, a second power storage portion which is connected to the first power storage portion in parallel, and stores power generated by the generator, and supplies power to the electric device in the vehicle, a first switch which is inserted in a path between the first power storage portion and the second power storage portion, a diode which is connected in parallel with the first switch such that a cathode side thereof is connected to the second power storage portion side, a second switch which is provided between the path and the second power storage portion, and a controlling portion which controls the first switch and the second switch based on remaining capacities of the first power storage portion and the second power storage portion. The controlling portion carries out the ON state of the first switch and the OFF state of the second switch, in a state that power is supplied from the generator to the vehicle power source device, when the remaining capacity of the first power storage portion is less than a predetermined minimum capacity of the first power storage portion, and the remaining capacity of the second power storage portion is more than a predetermined minimum capacity.

A vehicle power source device of the present disclosure efficiently confirms whether or not a switch for controlling power storage portions installed in a vehicle and connected in parallel, is normal.

DESCRIPTION OF EMBODIMENTS

Hereinafter, a vehicle power supply device related to embodiments of the present invention is explained. In the following explanation, the vehicle power supply device is installed in the vehicle having the idle stop function (idle reduction function) and the regenerative braking function.

In the idle stop function, an engine is automatically stopped at the time of stopping the vehicle, and the engine is automatically restarted at the time of starting the vehicle. In the regenerative braking function, power is generated by the regenerative braking in the inertia rotation of the engine without a fuel. Namely, an alternator operation during the normal driving is restricted, and the load of the engine is decreased. Both functions have an effect to improve a fuel efficiency.

In the vehicle having the idle stop function, the number of starting the engine is increased. Normally, the engine is started by a starter motor driven by a battery voltage. Therefore, as the number of starting the engine is increased, an electric power consumption is increased, and the number of discharging is increased. Further, in the vehicle having the regenerative braking function, as power is intensively generated at deceleration, a battery which has a large capacity and can be efficiently charged, is required.

Figure 1:
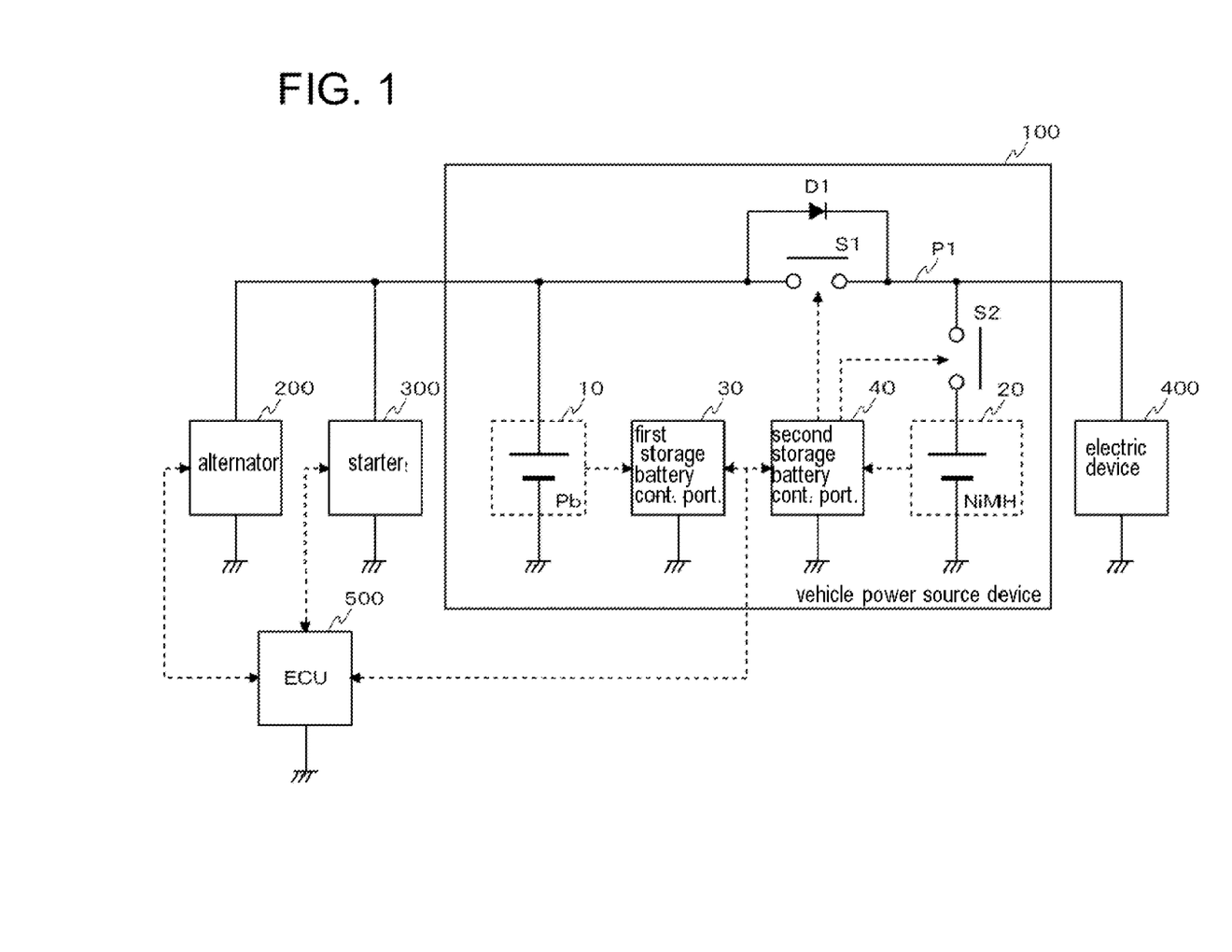
FIG. 1 is a figure showing a vehicle power supply device related to an embodiment of the present invention.

FIG. 1 is a figure showing a vehicle power supply device 100 related to an embodiment of the present invention. The vehicle which incorporates the vehicle power supply device 100, includes an alternator 200, a starter 300, an electric device 400, and an ECU (Electronic Control Unit) 500.

The alternator 200 generates power by a rotation energy of an crank shaft of the engine (not shown in the figures). In this embodiment, power is generated during deceleration. The alternator 200 supplies generated power to the vehicle power supply device 100.

The starter 300 is a motor for starting the engine. The starter 300 is rotated by power from the vehicle power supply device 100, and starts the engine. When an ignition switch (not shown in the figures) is turned on by an operation from a driver, power is supplied from the vehicle power supply device 100 to the starter 300, and the starter 300 starts.

The electric device 400 is a general term indicating many kinds of electric loads, such as, a headlight, a power steering, an oil pump, an car navigation system, an audio or the like. Here, in this specification, for convenience of explanation, the alternator 200, the starter 300, and the ECU are described in a separated state from the electric device 400. The electric device 400 is activated by power supplied from the vehicle power supply device 100.

The ECU 500 is connected to many kinds of auxiliary machinery, sensors, switches which are installed in the vehicle, and carries out electronic controls of the engine and many kinds of the auxiliary machinery. In the case that the idle stop function is carried out, when the ECU 500 detects the vehicle stopping or the deceleration less than a predetermined speed based on signals inputted from a brake, a vehicle speed sensor, or the like, the ECU 500 stops the engine. Then, the ECU 500 restarts the engine by detecting a release of the brake. At that time, the ECU 500 controls such that power is supplied form the vehicle power supply device 100 to the starter 300, and make the starter 300 operate.

In the case that the regenerative braking function is carried out, during the normal driving, the ECU 500 principally stops the alternator 200. When the ECU 500 detects the deceleration based on signals inputted from a brake, a vehicle speed sensor, or the like, and stops the engine. The ECU 500 makes the alternator 200 operate. Here, in the case that a battery capacity is less than a predetermined minimum capacity, the ECU 500 makes the alternator 200 operate even during the normal driving.

The vehicle power supply device 100 includes a first storage battery 10, a second storage battery 20, a first storage battery controlling portion 30, a second storage battery controlling portion 40, a first switch S1, a diode D1, and a second switch S2. The first storage battery 10 as a main battery stores power generated by the alternator 200, and supplies power to the starter 300 and the electric device 400. The second storage battery 20 as a sub-battery stores power generated by the alternator 200, and supplies power to the electric device 400. The first storage battery 10 and the second storage battery 20 is connected in parallel.

In this embodiment, the first storage battery 10 is a lead storage battery, and the second storage battery 20 is a nickel hydride storage battery. The lead storage battery has merits that it is inexpensive, and is capable of operating in the considerably wide temperature range, and has a high output. Then, the lead storage battery is widely used as a storage battery for the vehicle. However, the lead storage battery has demerits that the energy efficiency of charging and discharging is low, and it is weak in over charge or over discharge, and it has a short cycle life. The nickel hydride storage battery has merits that the energy efficiency of charging and discharging is considerably high, and it is strong in over charge or over discharge, and it has a wide temperature range of the usage, a wide SOC (State Of Charge) range, and a considerably long cycle life. However, the nickel hydride storage battery has demerits that the self-discharge is large, it has a memory effect and a low output voltage, and it is more expensive than the lead storage battery.

In the idle stop function, since the number of the usage of the starter 300 is increased, it is necessary to make the capacity of the storage battery large. The capacity of the lead storage battery is not increased, but the capacity of the whole storage battery is increased, compensating for demerits of the storage batteries each other by using the combination of plural kinds of the storage batteries having different characteristics.

In this embodiment, as one instance, the combination of the lead storage battery and the nickel hydride storage battery is explained. It is possible that the lead storage battery is combined with the lithium ion storage battery. The lithium ion storage battery is high in the energy density and the energy efficiency of charging and discharging, and is the storage battery of a high performance, but it is necessary to carry out the rigid voltage and temperature management.

Generally, the storage battery is disposed in the engine room. The nickel hydride storage battery is more suitable for disposing with the lead storage battery in the engine room than the lithium ion storage battery. In the engine room, the temperature is increased while the engine works, and the nickel hydride storage battery has a high-temperature higher resistance than that of the lithium ion storage battery. Here, in the case that the lithium ion storage battery connected to the lead storage battery is disposed at a location distant from the engine room, a loss is increased by wiring resistance.

The first switch S1 is inserted in a path P1 between the charging and discharging terminal of the first storage battery 10 and the charging and discharging terminal of the second storage battery 20. This path P1 is connected to the alternator 200, the starter 300, the electric device 400, and the path P1 is a common current path among the first storage battery 10, the second storage battery 20, the alternator 200, the starter 300, and the electric device 400. As the first switch S1, a relay or a semiconductor switching element (for example, MOSFET (Metal-Oxide-Semiconductor Field-Effect Transistor), IGBT (Insulated Gate Bipolar Transistor)) can be used. In this embodiment, the relay is used.

The first switch S1 is provided for voltage compensation such that the voltage of the above path P1 does not become a predetermined voltage or less at engine cranking and at restarting from a state of the idle stop. Generally, the above path P1 is designed at 12 V. In the electric device 400, once the input voltage of the car navigation system or the like decrease at about 10 V, it is reset. In order to prevent this, the first switch S1 is turned off during operation of the starter 300, and then the electric potential of the charging and discharging terminal of the second storage battery 20 is stabilized, it can supply a stable voltage to the electric device 400.

The diode D1 is connected to the first switch S1 in parallel. The cathode side of the diode D1 is connected to the second storage battery 20 side, and the anode side of the diode D1 is connected to the first storage battery 10 side. In a state that the first switch S1 is the OFF state, an electric current flows through the diode D1 from the alternator 200, the starter 300, and the first storage battery 10 side, to the second storage battery 20 and the electric device 40 side, but no electric current flows in the reverse direction.

The diode D1 functions as a protection diode of the first switch S1. When a large current more than the rated current of the switch S1 flows from the alternator 200 to the above path P1, the diode D1 protects the first switch S1. Further, when the first switch S1 is OFF and the second switch S2 is ON, namely when power is supplied only from the second storage battery 20 to the electric device 400, in the case that trouble in the second storage battery 20 occurs, the diode D1 functions so as to maintain the voltage of the electric device 400. Here, when a MOSFET is used as the first switch S1, the diode D1 can be a body diode of the MOSFET.

The second switch S2 is provided and connected between the node between the first switch S1 and the electric device 400, and the second storage battery 20. A relay or a semiconductor switching element can be also used as the second switch S2. In this embodiment, the relay is used.

The second switch S2 is provided in order to prevent over charge and over discharge of the second storage battery 20. Further, by turning off the second switch S2 at parking, it functions to prevent a flow of a dark current from the second storage battery 20. The nickel hydride storage battery or the lithium ion storage battery has a lower inner resistance than that of the lead storage battery, and a current easily flows, and then it easily becomes over charge or over discharge.

The first battery controlling portion 30 manages or controls the first storage battery 10. Concretely, it obtains a voltage, a current, a temperature of the first storage battery 10, and monitors a remaining capacity and the presence or absence of the abnormal state of the first storage battery 10. The first storage battery controlling portion 30 informs the second storage battery controlling portion 40 of the remaining capacity of the first storage battery 10, and informs the ECD 500 of the normal state or the abnormal state of the first storage battery 10. The communication among the first storage battery controlling portion 30, the second storage battery controlling portion 40, and the ECU 500 is carried out, for example, by CAN (Controller Area Network).

The second storage battery controlling portion 40 manages or controls the second storage battery 20. The second storage battery controlling portion 40 is more concretely explained in the following.

Figure 2:
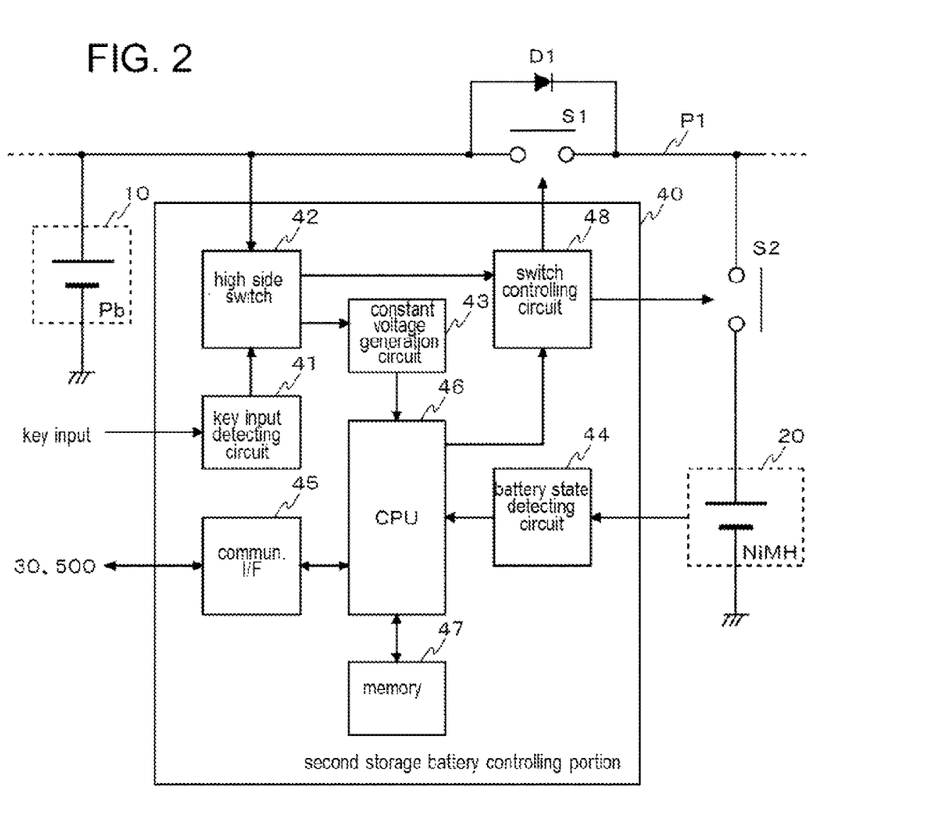
FIG. 2 is a figure explaining a second storage battery controlling portion of FIG. 1.

FIG. 2 is a figure explaining the second storage battery controlling portion 40 of FIG. 1. The second storage battery controlling portion 40 includes a key input detecting circuit 41, a high side switch 42, a constant voltage generation circuit 43, a battery state detecting circuit 44, a communication interface 45, a CPU 46, a memory 47, and a switch controlling circuit 48.

The key input detecting circuit 41 detects insertion or removal of the ignition key. The key input detecting circuit 41 carries out the ON control of the high side switch 42 when the driver inserts the ignition key, it carries out the OFF control of the high side switch 42 when the ignition key is removed. Here, the key input detecting circuit 41 holds the high side switch 42 OFF when the key position is OFF, and it carries out the ON control of the high side switch 42 when the key position is ACC, ON, or START.

The high side switch 42 is provided between the above path P1, and the constant voltage generation circuit 43 and the switch controlling circuit 48. When the high side switch 42 is turned on, the voltage of the above path P1 is supplied to the constant voltage generation circuit 43 and the switch controlling circuit 48.

The constant voltage generation circuit 43 generates a power source voltage of the CPU 46 and the switching controlling circuit 48. For example, the voltage 12 V of the above path P1 is reduced to the voltage 3 to 5 V. For example, a three-terminal regulator can be used as the constant voltage generation circuit 43.

In this way, by inserting the ignition key, electric power is supplied to the CPU 46, and the second storage battery controlling portion 40 starts.

The battery state detecting circuit 44 obtains a voltage, a current, a temperature of the second storage battery 20. The second storage battery 20 has a shunt resistor (not shown in the figures), and by monitoring both ends voltages of the shunt resistor, a current flowing through the second storage battery 20 can be detected. Further, the second storage battery 20 has a thermistor (not shown in the figures), and the temperature of the second storage battery 20 can be detected. The battery state detecting circuit 44 informs the CPU 46 of the voltage, the current, the temperature of the second storage battery 20.

The communication interface 45 is an interface for the communication among the second storage battery controlling portion 40 and other controlling circuits (the first storage battery controlling portion 30, the ECU 50 in this embodiment). The communication interface 45 transmits the information received from outside to the CPU 46, and transmits the information outputted from the CPU 46 to outside.

In this embodiment, the communication interface 45 receives a state (for example, SOC (State Of Charge) as the remaining capacity of the first storage battery 10) of the first storage battery 10 from the first storage battery controlling portion 30. In addition, the communication interface 45 receives the state information of the vehicle from the ECU 500.

Further, the communication interface 45 transmits the abnormal detection of the second storage battery 20 or the second storage battery controlling portion 40 to the ECU 500. Moreover, it transmits the state information of the second storage battery 20 (for example, a voltage, a current, a temperature) to the ECU 500. Further, it transmits the ON/OFF information of the first switch S1 and the second switch S2 to the ECU 500. In addition, it transmits the request of the power generation by the alternator 200 to the ECU 500.

The CPU 46 controls the whole second storage battery controlling portion 40. Especially, it carries out the ON/OFF control of the first switch S1 and the second switch S2, and the management of the state of the second storage battery 20. The memory 47 stores a controlling program which is carried out by the CPU 46, and data generated by the CPU 46.

The switch controlling circuit 48 turns on or off the first switch S1 and the second switch S2 according to the direction by the CPU 46. In the case that the first switch S1 and the second switch S2 are relays, it controls current passage/current non-passage of the relay coil. In the case of the semiconductor switching element, it controls the gate voltage.

Figure 3:
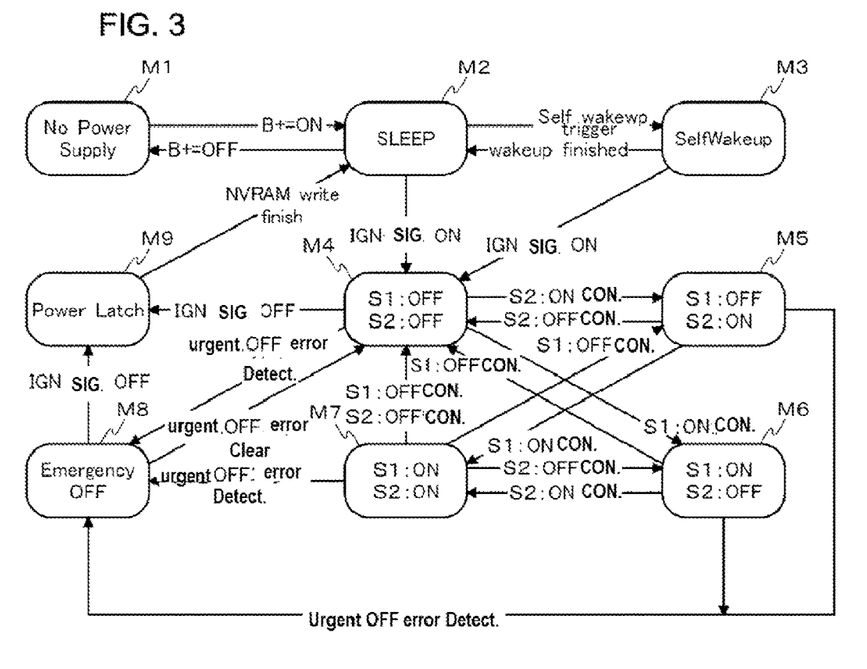
FIG. 3 is a figure showing operation modes of the second storage battery controlling portion.

FIG. 3 is a figure showing operation modes of the second storage battery controlling portion 40. In this embodiment, there are 9 types of the operation modes. "No Power Supply" mode M1 is a state that no voltage is applied to the above path P1. The state that the first storage battery 10 and the second storage battery 20 are not connected to the above path P1, is "No Power Supply" mode M1. Also, the state that the first storage battery 10 and the second storage battery 20 are empty, is "No Power Supply" mode M1.

"SLEEP" mode M2 is a state that a voltage is applied to the above path P1, but the second storage battery controlling portion 40 does not start. "Self Wakeup" mode M3 is a state that the second storage battery controlling portion 40 has started by Self Wakeup trigger. By Wakeup finished, the mode is shifted from "Self Wakeup" mode M3 to "SLEEP" mode M2. Self Wakeup trigger and Wakeup finished are periodically issued. The second storage battery controlling portion 40 periodically starts, and can confirm the remaining capacity of the second storage battery 20 or the like.

In "SLEEP" mode M2 or "Self Wakeup" mode M3, by inserting the ignition key, the second storage battery controlling portion 40 starts, and the mode is shifted to "S1: OFF, S2: OFF" mode M4. "S1: OFF, S2: OFF" mode M4 is a mode that both of the first switch S1 and the second switch S2 are the OFF state.

In "S1: OFF, S2: OFF" mode M4, when the second switch is turned on, the mode is shifted to "S1: ON, S2: OFF" mode M6.

In "S1: OFF, S2: ON" mode M5, when the second switch S2 is turned off, the mode is shifted to "S1: OFF, S2: OFF" mode M4. Also, in "S1: OFF, S2: ON" mode M5, when the first switch S1 is turned on, the mode is shifted to "S1: ON, S2: ON" mode M7.

In "S1: ON, S2: OFF" mode M6, when the first switch S1 is turned off, the mode is shifted to "S1: OFF, S2: OFF" mode M4. Also, in "S1: ON, S2: OFF" mode M6, when the second switch S2 is turned on, the mode is shifted to "S1: ON, S2: ON" mode M7.

In "S1: ON, S2: ON" mode M7, when the first switch S1 and the second switch S2 are turned off, the mode is shifted to "S1: OFF, S2: OFF" mode M4. Also, in "S1: ON, S2: ON" mode M7, when the first switch S1 is turned off, the mode is shifted to "S1: OFF, S2: ON" mode M5. Also, in "S1: ON, S2: ON" mode M7, when the second switch S2 is turned off, the mode is shifted to "S1: ON, S2: OFF" mode M6.

While the second storage battery controlling portion 40 normally operates, the mode is shifted among "S1: OFF, S2: OFF" mode M4, "S1: OFF, S2: ON" mode M5, "S1: ON, S2: OFF" mode M6, "S1: ON, S2: ON" mode M7.

In "S1: OFF, S2: OFF" mode M4, "S1: OFF, S2: ON" mode M5, "S1: ON, S2: OFF" mode M6, or "S1: ON, S2: ON" mode M7, when the error is detected in the inner circuit of the second storage battery 20, the first switch S1, the second switch S2, or the second storage battery controlling portion 40, the mode is shifted to "Emergency OFF" mode M8.

In "Emergency OFF" mode M8, the first switch S1 and the second S2 are turned off. Here, depending on the error content, in the case that turning off in either one is enough, only either one may be turned off. Further, in "Emergency OFF" mode M8, a detection of the error is transmitted to the ECU 500. When the ECU receives this information, the ECU 500 carries out the control of stopping the alternator 200, informing the driver of the alert.

In "S1: OFF, S2: OFF" mode M4 or "Emergency OFF" mode M8, by removing the ignition key, the mode is shifted to "Power Latch" mode M9. In "Power Latch" mode M9, the information of SOC of the second storage battery 20 or the like is stored in a nonvolatile memory, and the mode is shifted to "SLEEP" mode M2.

Figure 4:
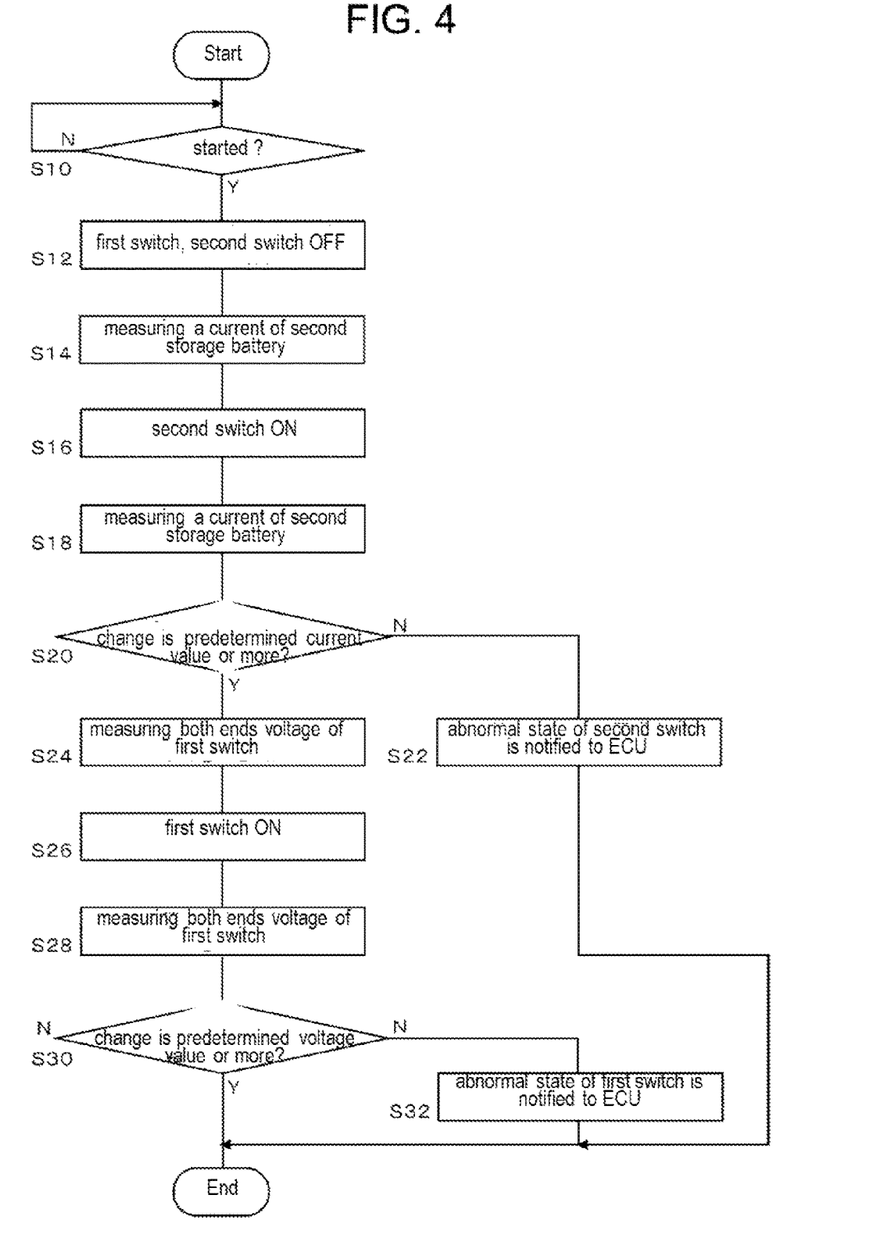
FIG. 4 is a flow chart explaining processes of the second storage battery controlling portion at starting.

FIG. 4 is a flow chart explaining processes of the second storage battery controlling portion 40 at starting. The second storage battery controlling portion 40 starts by inserting the ignition key (Y in S10). The second storage battery controlling portion 40 turns off the first switch S1 and the second switch S2 (S12). Here, at starting, when the first switch S1 and the second switch S2 are OFF, its state is held.

The second storage battery controlling portion 40 measures a current flowing through the second storage battery 20 (S14). After that, the second storage battery controlling portion 40 turns on the second switch S2 (S16). The second storage battery controlling portion 40 measures a current flowing through the second storage battery 20 in a state that the first switch S1 is OFF and the second switch S2 is ON (S18).

The second storage battery controlling portion 40 detects a change of the currents flowing through the second storage battery 20 before and after turning on the second switch S2, and determines as to whether or not the change is a predetermined current value or more (S20). When the change is less than the predetermined current value (N of S20), the abnormal state of the second switch S2 is notified to the ECU 500 (S22).

When the second switch S2 is normal, no current flows to the second storage battery 20 in a state that the second switch S2 is OFF, and a current flows to the second storage battery 20 in a state that the second switch S2 is ON. On the other hand, when there are troubles of a contact point welding of the second switch S2 (the relay), an open breakdown thereof, a breakdown of the switch controlling circuit 48, a disconnection between the switch controlling circuit 48 and the second switch S2, or the like, regardless of the ON control of the second switch S2, a current does not flow to the second storage battery 20, or a current continues to flow to the second storage battery 20. Namely, a current does not change before and after the ON control.

Therefore, when there is no change of the currents before and after the ON control of the second switch S2, it is considered that the abnormal state in the second switch S2 in itself or its control system occurs. The above predetermined current value is set at the value which is decided from the experiment or the simulation by the designer.

In step S20, when a change of the currents is the predetermined current value or more (Y of S20), the second storage battery controlling portion 40 determines that the second switch S2 is normal. Next, the second storage battery controlling portion 40 measures both ends voltage of the first switch S1 in a state that the first switch S1 is OFF and the second switch S2 is ON (S24). Both ends voltage of the first switch S1 is specified by the voltage of the difference between the voltage of the first storage battery 10 and the voltage of the second storage battery 20.

After that, the second storage battery controlling portion 40 turns on the first switch S1 (S26). The second storage battery controlling portion 40 measures both ends voltage of the first switch S1 in a state that the first switch S1 and the second switch S2 are ON (S28).

The second storage battery controlling portion 40 detects a change of both ends voltage of the first switch S1 before and after turning on the first switch S1, and determines as to whether or not the change is a predetermined voltage value or more (S30). When the change is less than the predetermined voltage value (N of S30), the abnormal state of the first switch S1 is notified to the ECU 500 (S32).

When the first switch S1 is normal, both ends voltage of the first switch S1 is the forward drop voltage Vf of the diode D1 in a state that the first switch S1 is OFF, and both ends voltage of the first switch S1 is about zero in a state that the first switch S1 is ON. On the other hand, when there are troubles of a contact point welding of the first switch S1 (the relay), an open breakdown thereof, a breakdown of the switch controlling circuit 48, a disconnection between the switch controlling circuit 48 and the first switch S1, or the like, regardless of the ON control of the first switch S1, the voltages does not change before and after the ON control of the first switch S1.

Therefore, when there is no change of the voltages before and after the ON control of the first switch S1, it is considered that the abnormal state in the first switch S1 in itself or its control system occurs. The above predetermined voltage value is set at the value which is decided from the experiment or the simulation by the designer.

In step S30, when the change of the voltages is the predetermined voltage value or more (Y of S30), the second storage battery controlling portion 40 determines that the first switch S1 is normal, and ends the processes at starting.

Figure 5:
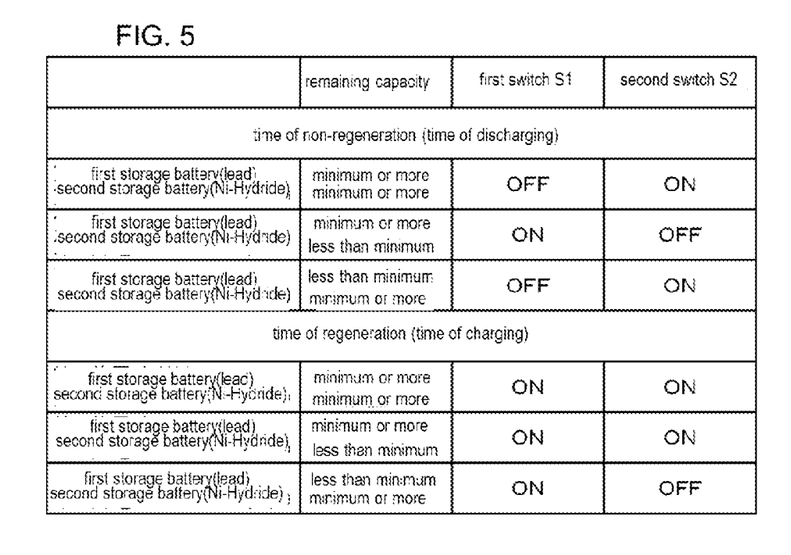
FIG. 5 is a table explaining processes of the second storage battery controlling portion after starting.
Figure 6:
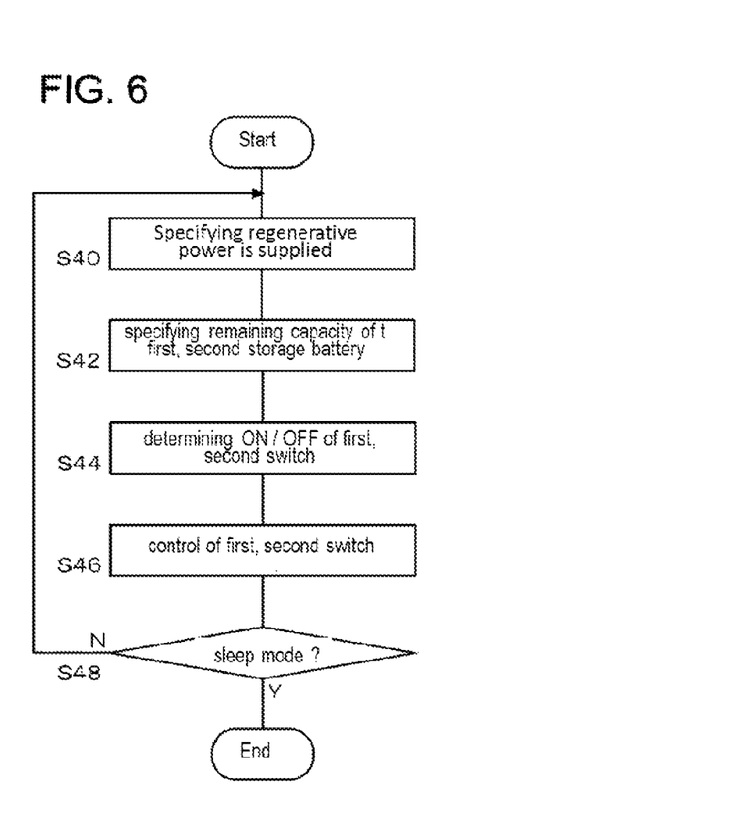
FIG. 6 is a flow chart explaining processes of the second storage battery controlling portion after starting.

FIG. 5 is a table explaining processes of the second storage battery controlling portion 40 after starting. FIG. 6 is a flow chart explaining processes of the second storage battery controlling portion 40 after starting. The second storage battery controlling portion 40 determines the ON/OFF of the first switch S1 and the second switch S2 based on whether or not the regenerative power is supplied from the alternator 200 to the vehicle power supply device 100, or corresponding to the remaining capacity of the first storage battery 10 and the remaining capacity of the second storage battery 20.

In FIG. 6, the second storage battery controlling portion 40 specifies as to whether or not the regenerative power is supplied from the alternator 200 to the vehicle power supply device 100 based on the state information of the alternator 200 notified from the ECU 500 (S40). Further, the second storage battery controlling portion 40 obtains the remaining capacity of the first storage battery 10 from the first storage battery controlling portion 30, and specifies the remaining capacity of the second storage battery 20 based on a current value, a voltage value measured in the second storage battery 20 (S42). The second storage battery controlling portion 40 determines the ON/OFF of the first switch S1 and the second switch S2 referring to the table shown in FIG. 5 (S44).

In FIG. 5, the time of non-regeneration is explained. At the time of non-regeneration, the first storage battery 10 and the second storage battery 20 are not charged, the first storage battery 10 and the second storage battery 20 are discharged. When the remaining capacity of the first storage battery 10 is its predetermined minimum capacity or more, and the remaining capacity of the second storage battery 20 is also its predetermined minimum capacity or more, the second storage battery controlling portion 40 carries out the OFF control of the first switch S1 and the ON control of the second switch S2. Thus, since power is preferentially supplied to the electric device 400 from the second storage battery 20, discharging from the first storage battery 10 (the lead storage battery in this embodiment) is decreased, and then the life of the first storage battery 10 can be extended.

The predetermined minimum capacity value of the first storage battery 10 (the lead storage battery in this embodiment) is set, for example, at SOC=about 80%. Since the degradation accelerates by using the lead storage battery at a state of low SOC, the predetermined minimum capacity value is set at the high level. The predetermined minimum capacity value of the second storage battery 20 (the nickel hydride storage battery in this embodiment) is set, for example, at SOC=about 20%. Since the degradation does not progress, compared with the lead storage battery by using the nickel hydride storage battery even at a state of low SOC, the predetermined minimum capacity value is set at the low level.

When the remaining capacity of the first storage battery 10 is its predetermined minimum capacity or more and the remaining capacity of the second storage battery 20 is less than its predetermined minimum capacity, the second storage controlling portion 40 carries out the OFF control of the first switch S1 and the ON control of the second switch S2. This prevents the over discharge of the second storage battery 20. Here, at starting the engine, it may carry out the OFF When the remaining capacity of the first storage battery 10 is less than its predetermined minimum capacity and the remaining capacity of the second storage battery 20 is its predetermined minimum capacity or more, the second storage controlling portion 40 carries out the OFF control of the first switch S1 and the ON control of the second switch S2. This prevents the over discharge of the first storage battery 10. The voltage of the lead storage battery decreases at the time of the over discharge.

Here, it fundamentally does not occur that the remaining capacity of the first storage battery 10 is less than its predetermined minimum capacity and the remaining capacity of the second storage battery 20 is less than its predetermined minimum capacity. It is a reason why the ECU 500 controls the alternator 200 such that such a state does not occur. However, the ECU 500 cannot control as to if the power generated by the alternator 200 charges the first storage battery 10 or the second storage battery 20.

Next, the time of the regeneration (regenerative charging) is explained. The first storage battery 10 and the second storage battery 20 are charged by the power generated by the alternator 200 at the time of the regeneration (regenerative charging). When the remaining capacity of the first storage battery 10 is its predetermined minimum capacity or more, and the remaining capacity of the second storage battery 20 is also its predetermined minimum capacity or more, the second storage battery controlling portion 40 carries out the ON control of the first switch S1 and the ON control of the second switch S2. Here, it is not shown in the figures, when the remaining capacity of the second storage battery 20 is more than a predetermined maximum capacity, the first switch S1 is turned off. The second switch S2 is turned on in order to preferentially discharge the second storage battery 20. The predetermined maximum capacity of the second storage battery 20 (the nickel hydride storage battery in this embodiment) is set at, for example, SOC=about 60%.

When the remaining capacity of the first storage battery 10 is its predetermined minimum capacity or more, and the remaining capacity of the second storage battery 20 is less than its predetermined minimum capacity, the second storage battery controlling portion 40 also carries out the ON control of the first switch S1 and the ON control of the second switch S2. Here, it is not shown in the figures, when the remaining capacity of the second storage battery 20 is more than the predetermined maximum capacity, the first switch S1 is turned off.

When the remaining capacity of the first storage battery 10 is less than its predetermined minimum capacity, and the remaining capacity of the second storage battery 20 is its predetermined minimum capacity or more, the second storage battery controlling portion 40 carries out the ON control of the first switch S1 and the OFF control of the second switch S2. By this, the first storage battery 10 is preferentially charged.

The explanation is returned to FIG. 6. The second storage battery controlling portion 40 carries out the control of the first switch S1 and the second switch S2 based on the determined ON/OFF states of the first switch S1 and the second switch S2 (S46). The processes of the above step S40 to step S46 are repeated (N of S48) until the mode is shifted to the sleep mode (Y of S48).

According to this embodiment explained above, as the trouble checks (including the breakdown) of the second switch S2 and the first switch S1 are carried out in order at starting of the second storage battery controlling portion 40, the trouble determination can be efficiently made as to whether or not the first switch S1 and the second switch S2 are normal. Assuming that the trouble determination of the first switch S1 is made in advance, as the second switch is fundamentally the OFF state, it is impossible that the voltage of the second storage battery 20 side of the first switch S1 is detected from the second storage battery 20.

Therefore, it is necessary that another voltage detecting line is provided at the second storage battery 20 side of the first switch S1, or the second switch S2 is turned on. The former increases the cost, and in the latter it is necessary that the second switch S2 is turned off again in the trouble determination of the second switch S2 after that. In this embodiment, as the second storage battery 20 is fundamentally positively used, the second switch S2 is fundamentally the ON state. Therefore, after the trouble determination of the second switch S2, it is necessary that the second switch S2 is turned on again.

In this point, when the trouble determination of the second switch S2 is carried out in advance, as the second switch S2 is the ON state after its trouble determination, both ends voltages of the first switch S1 can be detected from the terminal voltages of the first storage battery 10 and the second storage battery 20. Namely, without the useless ON/OFF controls of the first switch S1 and the second switch S2, the trouble determinations of the first switch S1 and the second switch S2 can be made.

Further, by carrying out the ON/OFF controls of the first switch S1 and the second switch S2 corresponding to the remaining capacities of the first storage battery 10 and the second storage battery 20, the over discharge and the over charge of the first storage battery 10 and the second storage battery 20 can be suppressed. In addition, the second storage battery 20 (the nickel hydride storage battery in this embodiment) can be efficiently discharged, and the life of the first storage battery 10 (the lead storage battery in this embodiment) can be extended.

In addition, when the remaining capacity of the second storage battery 20 exceeds its predetermined maximum capacity, by turning off the first switch S1, it is suppressed that the second storage battery 20 is over-charged. On the contrast, when the remaining capacity of the second storage battery 20 is less than its predetermined minimum capacity, by turning off the second switch S2, it is suppressed that the second storage battery 20 is over-discharged. After that, when the regenerative power generation from the alternator 200 is started, by turning on the second switch S2 the second storage battery can be charged. Moreover, turning off the second switch S2 at the time of parking, it prevent the dark current flowing from the second storage battery 20, and it is suppressed that the second storage battery 20 is over-discharged.

The above explanation is made based on the embodiments of the present invention. The person of the ordinary skill in the art can understand that these embodiments are illustrated, and these constitution elements and these combined processes can be modified, and such modified examples are covered by the scope of the present invention.

In the above embodiment, the first storage battery 10 and the second storage battery 20 are respectively managed and controlled by two controlling circuits of the first storage battery controlling portion 30 and the second storage battery controlling portion 40. However, the first storage battery 10 and the second storage battery 20 can be managed and controlled by one controlling circuit.

Further, in the above embodiment, the first storage battery 10 is connected to the nickel hydride storage battery in parallel, but in place of the nickel hydride storage battery, a capacitor (for example, an electric double layer capacitor) can be used.

A fuse can be provided between the above path P1 and the second switch S2, or between the second switch S2 and the second storage battery 20. In this case, even though the trouble of the second switch S2 occurs, the second storage battery 20 is protected against a large current.

The invention claimed is:

1. A vehicle power source device comprising:
    a first power storage portion which stores power generated by a generator in a vehicle, and supplies power to a motor for starting an engine and an electric device in the vehicle;
    a second power storage portion which is connected to the first power storage portion in parallel, and stores power generated by the generator, and supplies power to the electric device in the vehicle;
    a first switch which is inserted in a path between the first power storage portion and the second power storage portion;
    a diode which is connected in parallel with the first switch such that a cathode side thereof is connected to the second power storage portion side;
    a second switch which is provided between the path and the second power storage portion;
    a switch controlling circuit configured to control the first switch and the second switch, the switch controlling circuit switching the first switch and the second switch to an OFF state at a time of starting of the vehicle power source device, and after the time of the starting of the vehicle power source device, the switch controlling circuit switching, in order, the second switch to an ON state and the first switch to the ON state; and a controlling portion including the switch controlling circuit and an abnormal state detection portion configured to determine whether or not the second switch is operating normally, wherein at the time of starting the vehicle power source device and after the switch controlling circuit switches the first switch and the second switch to the OFF state, the controlling portion measures a first current flowing through the second power storage portion, wherein after the time of starting the vehicle power source device and after the switch controlling circuit switches the second switch to the ON state, the controlling portion measures a second current flowing through the second power storage portion, and wherein the abnormal state detection portion determines whether or not the second switch is operating normally based on a difference between the measured first current and the measured second current.

2. The vehicle power source device according to claim 1, wherein at the time of starting the vehicle power source device and after the switch controlling circuit switches the first switch and the second switch to the OFF state, the controlling portion measures a first electrical potential difference between the first power storage portion and the second power storage portion, wherein after the time of starting the vehicle power source device and after the switch controlling circuit switches the second switch to the ON state, the controlling portion measures a second electrical potential difference between the first power storage portion and the second power storage portion, and wherein the abnormal state detection portion determines whether or not the second switch is operating normally based on a difference between the measured first electrical potential difference and the measured second electrical potential difference.

3. The vehicle power source device according to claim 1, wherein the first power storage portion includes a lead battery, and the second power storage portion includes a nickel hydride storage battery.

4. The vehicle power source device according to claim 1, wherein the controlling portion measures, as the first electrical potential difference and the second electrical potential difference, voltage at both ends of the first switch.

\* \* \* \* \*